(12) United States Patent
Rod

(10) Patent No.: US 9,228,303 B2
(45) Date of Patent: Jan. 5, 2016

(54) DEVICE FOR A HELICOPTER DECK

(71) Applicant: Marine Aluminium AS, Avaldsnes (NO)

(72) Inventor: Karl Johan Rod, Haugesund (NO)

(73) Assignee: Marine Aluminium AS, Avaldsnes (NO)

( * ) Notice: Subject to any disclaimer, the term of this patent is extended or adjusted under 35 U.S.C. 154(b) by 121 days.

(21) Appl. No.: 14/346,843

(22) PCT Filed: Oct. 4, 2012

(86) PCT No.: PCT/NO2012/050191
§ 371 (c)(1),
(2) Date: Mar. 24, 2014

(87) PCT Pub. No.: WO2013/055227
PCT Pub. Date: Apr. 18, 2013

(65) Prior Publication Data
US 2014/0319273 A1    Oct. 30, 2014

(30) Foreign Application Priority Data

Oct. 12, 2011    (NO) .................................... 20111383

(51) Int. Cl.
*B64F 1/00*    (2006.01)
*B64F 1/36*    (2006.01)
(Continued)

(52) U.S. Cl.
CPC ... *E01F 5/00* (2013.01); *A62C 3/00* (2013.01); *A62C 3/08* (2013.01); *B64F 1/00* (2013.01); *B64F 1/007* (2013.01); *B64F 1/28* (2013.01); *E01C 9/008* (2013.01); *E01C 11/225* (2013.01); *E01C 11/228* (2013.01); *E01F 3/00* (2013.01); *A62C 3/06* (2013.01)

(58) Field of Classification Search
CPC .............. B64F 1/00; B64F 1/007; B64F 1/28; A62C 3/00; A62C 3/06; E01F 3/00; E01F 5/00; E01C 11/228; E01C 11/225; E01C 9/008
See application file for complete search history.

(56) References Cited

U.S. PATENT DOCUMENTS

| 3,555,762 A | 1/1971 | Costanzo, Jr. |
| 4,474,130 A * | 10/1984 | Birkeland ................. E01F 3/00 114/258 |

(Continued)

FOREIGN PATENT DOCUMENTS

| NO | 154957 | 12/1985 |
| NO | 842595 | 12/1985 |

(Continued)

OTHER PUBLICATIONS

International Search Report and Written Opinion for PCT/NO2012/050191, dated Jan. 4, 2013.

*Primary Examiner* — Philip J Bonzell
(74) *Attorney, Agent, or Firm* — Andrus Intellectual Property Law, LLP

(57) ABSTRACT

A device is for a helicopter deck comprising a supporting, fluid-tight floor. The helicopter deck comprises an overlying, draining top cover formed out of at least two top-cover sections arranged side by side. Each of the top-cover sections comprise a surface portion provided with several drain openings and at least one channel wall projecting downwards, provided with a foot portion which is arranged to be positioned on the surface of the floor. At least one drain channel is defined by the top cover, the floor and two adjacent channel walls. The drain channel is provided with a mouth portion which is connected to a collecting channel. Fluid-transport paths are formed through the at least one drain channel between the drain openings and a drain in the collecting channel. The top-cover sections are detachable from the floor and adjacent top-cover sections.

15 Claims, 3 Drawing Sheets

Figure 1:
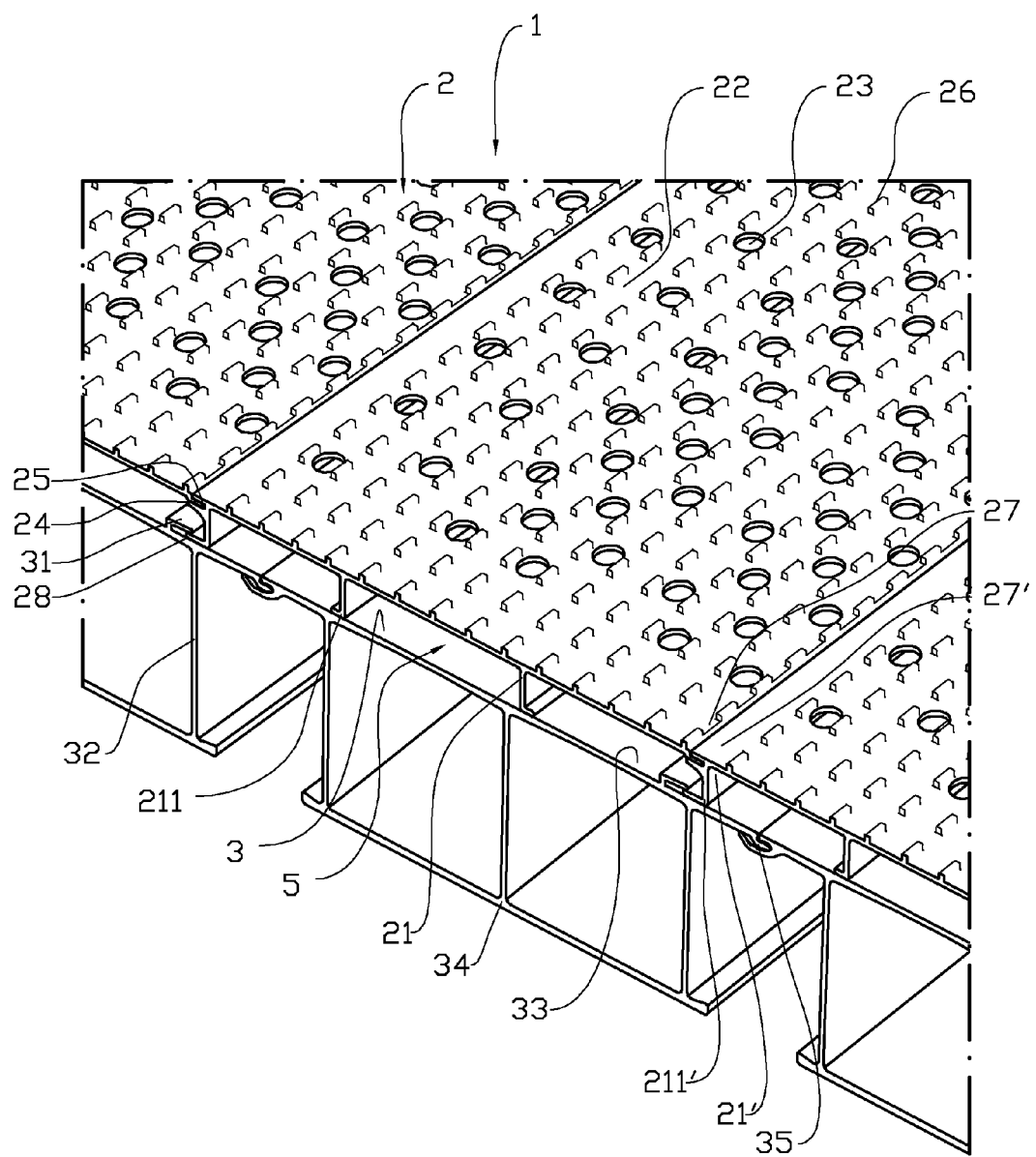

(51) Int. Cl.

| | |
|---|---|
| *E01F 3/00* | (2006.01) |
| *E01F 5/00* | (2006.01) |
| *A62C 3/00* | (2006.01) |
| *E01C 9/00* | (2006.01) |
| *E01C 11/22* | (2006.01) |
| *A62C 3/08* | (2006.01) |
| *B64F 1/28* | (2006.01) |
| *A62C 3/06* | (2006.01) |

(56) References Cited

U.S. PATENT DOCUMENTS

| | | | | |
|---|---|---|---|---|
| 4,657,086 A | * | 4/1987 | Aanensen | E01F 3/00 169/54 |
| 4,789,116 A | * | 12/1988 | Eftestol | A62C 3/00 244/114 R |
| 4,836,472 A | * | 6/1989 | Sutter | A62C 3/00 114/258 |
| 5,351,915 A | * | 10/1994 | Aandalen | E01F 3/00 244/114 R |
| 8,205,831 B2 | * | 6/2012 | Becht, IV | B64F 1/007 244/114 R |

FOREIGN PATENT DOCUMENTS

| | | |
|---|---|---|
| WO | 8600274 | 1/1986 |
| WO | 8805481 | 7/1988 |
| WO | 9734658 | 9/1997 |
| WO | 201074653 | 7/2010 |

* cited by examiner

DEVICE FOR A HELICOPTER DECK

CROSS-REFERENCE TO RELATED APPLICATIONS

This application is the U.S. national stage application of International Application PCT/NO2012/050191, filed Oct. 4, 2012, which international application was published on Apr. 18, 2013, as International Publication WO2013/055227 in the English language. The international application is incorporated herein by reference, in entirety. The international application claims priority to Norwegian Patent Application No. 20111383, which is incorporated herein by reference.

A helicopter deck is described, which includes a supporting, fluid-tight floor in which there is an overlying, draining top cover made up of detachable sections, in which a flammable fluid is rapidly drained away from the surface of the helicopter deck into a suitable collection channel, the exposure of the fluid to air being restricted with the purpose of reducing the extent of damage in a possible fire in the flammable fluid, and preventing a flammable fluid that has reached the helicopter deck, from spreading.

When there is spillage of a flammable fluid on a helicopter deck, for example spillage during the filling of fuel on a helicopter or as a helicopter is damaged, there is a great risk of the flammable fluid igniting. When there is spillage, there is a wish that the fluid should be carried away from the helicopter deck and be collected in a suitable receptacle. The capacity of the drainage must meet the applicable requirements.

In a possible fire in the fluid, it is important that the supporting structure of the helicopter deck is not damaged by the fire and that the fluid is not spread from the helicopter deck and the draining device of the helicopter deck. It is also necessary to reduce the spreading of burning fluid in order to limit damage and risk to the surroundings. There may be requirements for the supporting structure and the fluid-tightness of a helicopter deck not to be damaged even if there is an inflow of burning fluid for a given period of time, for example 10 minutes.

After a fire, it may be desirable and sometimes essential to replace portions of the helicopter deck that have been exposed to strong heat, as such portions may be deformed or have reduced strength. In such cases, it will be an advantage that replacement can take place within a short time, with replacement of as few undamaged portions as possible and by using the smallest possible amount of resources.

When water and water-based extinguishants are used, it may be a problem in some relevant geographic regions that the water supply is reduced by, for example, icing or biological growth in the water-supply system. In such cases, a passive fire protection is desired in order to reduce the need for water as an extinguishant.

A known solution is fluid being carried away from the surface of the helicopter deck through perforations in the surface of the supporting structure and then through drain channels in the supporting structure. These channels are filled with metal chips, for example of aluminium. The task of the metal chips is to allow fluid to pass, but reduce the access of oxygen. The combination of fluid drainage and lack of oxygen leads to reduced spreading and size of flames in afire. Problems with known solutions are that when the channels are damaged because of heat generation, supporting structures must be replaced, and that is a resource-demanding operation. It is also a problem that when metal chips are used in the drain channels, there is a great risk of reduced capacity over time because of clogging by dirt and foreign bodies. Another drawback is that the lack of ventilation of the channels may give rise to corrosion in said channels. A fire to which flammable fluid is supplied over time may damage the metal chips and thereby ruin the draining and fire-retardant effects.

WO 1988/05481 A1 discloses a helicopter platform which is formed to be passively fire-retardant, fuel spillage on the top cover of the platform being drained away through drain openings in a grate and further out through built-in channels.

WO 1997/34658 A1 discloses a helicopter platform which is formed to be passively fire-retardant, fuel spillage on the platform being drained away through a drain channel.

NO 154957 B discloses a helicopter platform formed to be passively fire-retardant, fuel spillage on the platform being drained away through a drain channel.

WO 2010/74653 A9 discloses a helicopter platform which is formed to be passively fire-retardant, nozzles spraying water over the platform in a fire.

U.S. Pat. No. 3,555,762 A discloses top-cover sections which may be laid on another floor.

The invention has for its object to remedy or reduce at least one of the drawbacks of the prior art or at least provide a useful alternative to the prior art.

The object is achieved through features which are specified in the description below and in the claims that follow.

A draining top cover for use on a helicopter deck is provided. The top cover is placed on top of the fluid-tight floor of the helicopter deck. The top cover may be retrofitted on an existing helicopter deck. The top cover has a retardant effect on a fire in a fluid that has reached the surface of the helicopter deck, dampening heat generation in the fluid-tight floor and supporting structures of the helicopter deck.

For a fire to develop, there are three factors that must be present. These factors are a combustible material, oxygen and heat. It is known that to burn 1 kg of hydrocarbons, approximately 15 kg of air is used. The fire-retardant effect of the invention is provided by a flammable fluid being drained away from the surface of the helicopter deck and the access of air to the drained fluid being reduced. Besides, the top cover may be termed a sacrificial cover, meaning that the top cover is sacrificed for the benefit of the main construction in a fire. After a fire, damaged top-cover sections are to be replaceable with new, undamaged sections. It is therefore an advantage for the sections to be of such a size that they can be handled by one or more persons without the aid of hoisting devices as such devices are not available on all helicopter decks.

The invention relates more specifically to a device for a helicopter deck which includes a supporting, fluid-tight floor and an overlying, draining top cover formed out of at least two top-cover sections arranged side by side, each of the top-cover sections comprising a surface portion provided with several drain openings and at least one channel wall projecting downwards, provided with a foot portion which is arranged to be positioned on the surface of the floor, characterized by the helicopter deck further comprising:

at least one drain channel defined by the top cover, the floor and two adjacent channel walls, the drain channel being provided with a mouth portion which is connected to a collecting channel;

fluid-transport paths being formed through the at least one drain channel between the drain openings and a drain in the collecting channel; and the top-cover sections being detachable from the floor and adjacent top-cover sections.

The collecting channel may be a closed one.

Except for the drain openings, the fluid-transport path may be airtight towards the ambient atmosphere.

At an edge portion, each top-cover section may be provided with a projecting portion which is arranged to engage a corresponding groove in the edge portion of the adjacent top-cover section.

At least one of the channel walls of the top-cover section may be provided with a widened foot portion forming an engagement portion.

The engagement portion may be arranged to engage a corresponding fixing portion in the surface of the floor.

The engagement portion of the widened foot portion may be a lip, and the fixing portion of the floor may be a corresponding slot.

The engagement portion may be arranged to be fixed to the floor by the use of a fastening means.

The drain channel may be directly connected to the collecting channel.

The collecting channel may have an extent in the entire circumference of the helicopter deck.

The drain openings may be evenly distributed in the extent of the surface portion in the longitudinal direction.

The perforation ratio of the top cover may be 5-15%.

The perforation ratio of the top cover may be 8-12%.

The floor may be arranged with a downward slope towards the collecting channel(s).

The top-cover section may be provided with at least one longitudinal cable groove arranged to receive a heater cable.

The cable groove and the heater cable may be sealed up with a sealing substance.

During testing of the invention, wherein fuel of the kerosene type was supplied continuously to a fire for 11.5 minutes in an amount that is in keeping with an imaginary leakage from the fuel system of a damaged helicopter, the highest temperature in the floor underneath the top-cover sections was surprisingly measured to be just 42° C., way below the temperatures representing any risk of damaging the floor structure, that is.

Figure 2:
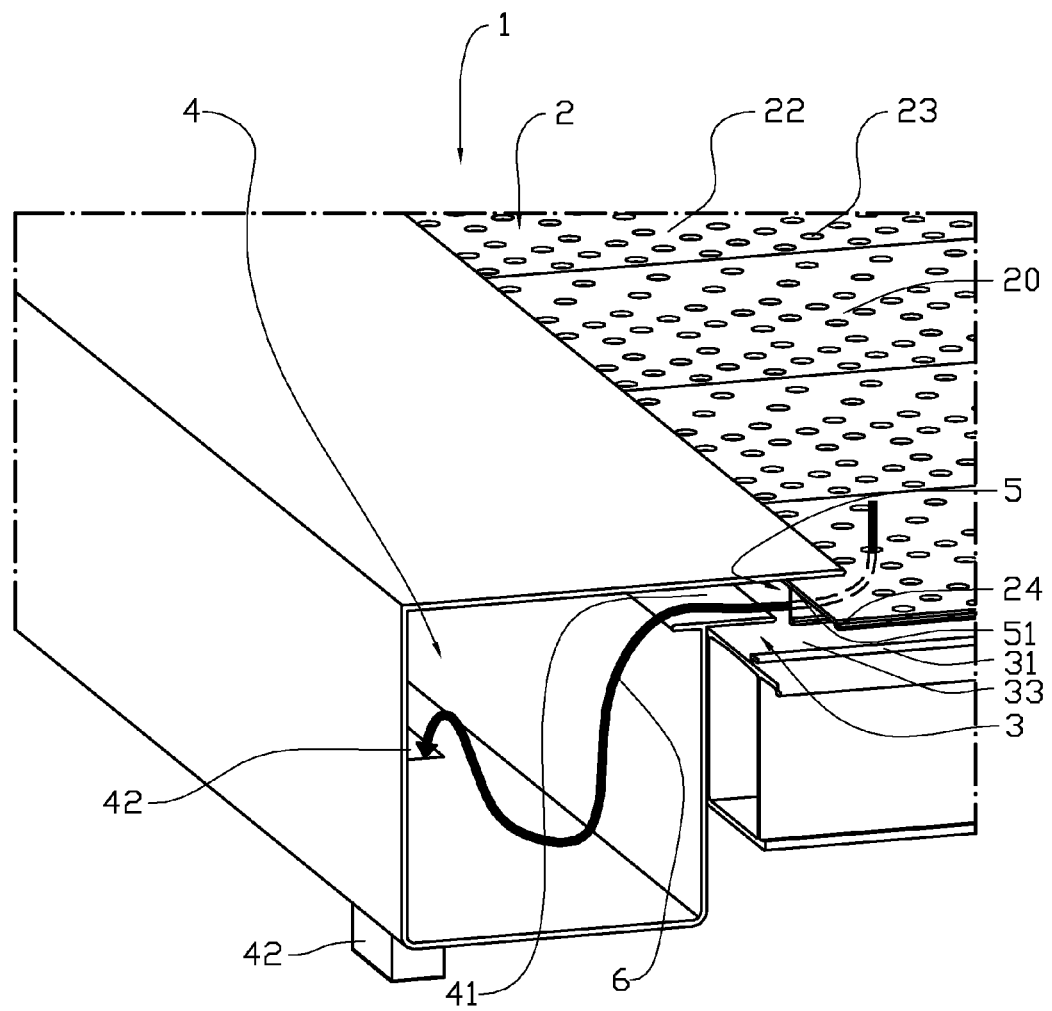
Figure 3:
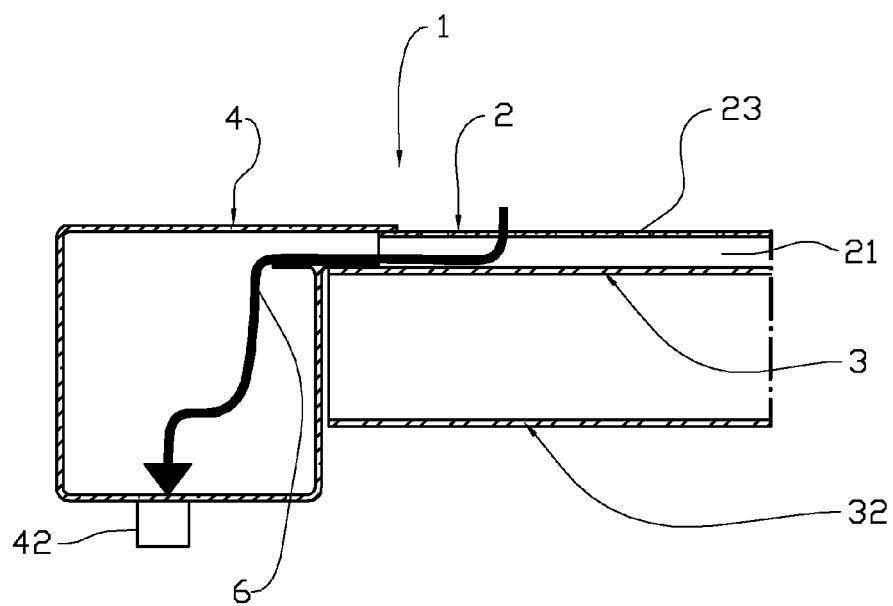
Figure 4:
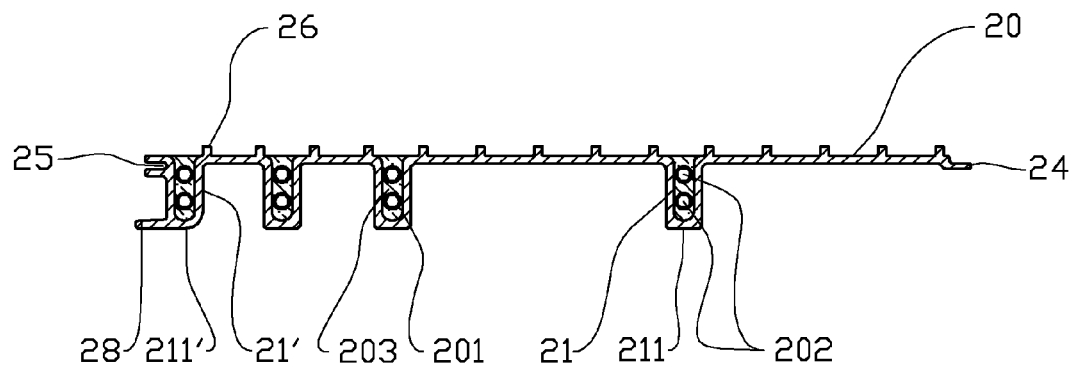

In what follows, an example of a preferred embodiment is described, which is visualized in the accompanying drawings, in which:

FIG. 1 shows a cutaway perspective of a top cover placed on top of a helicopter deck equipped with attachment grooves for the top cover, FIG. 2 shows a cutaway perspective of a collecting channel that communicates with the helicopter deck and the top cover, FIG. 3 shows a cross section of the collecting channel, the floor and the top cover with a fluid-transport path, and FIG. 4 shows a cross section of an alternative embodiment of the top-cover section in which several cable grooves are arranged for a heater cable to be recessed therein.

In the figures, the reference numeral 1 indicates a section of a helicopter deck. The helicopter deck 1 includes a supporting, fluid-tight floor 3 with a top cover 2 arranged in an overlying manner. The floor 3 is arranged with a downward slope towards a collecting channel 4.

In the embodiment shown, the top cover 2 is made up of several top-cover sections 20 of extruded aluminium. A top-cover section 20 comprises a surface portion 22 and four channel walls 21, 21' projecting downwards. Each channel wall 21, 21' is provided with a foot portion 211, 211'. A widened foot portion 211' is provided with an engagement portion 28, shown as a lip in the example. In an edge portion 27, the top-cover section 20 is provided with a projecting engagement portion in the form of a lip 24 and, in an opposite edge portion 27', with a groove 25 which may accommodate the lip 24. The surface portion 22 is provided with several drain openings 23.

In the example shown, the floor 3 is formed out of interconnected, extruded floor sections 34 made of aluminium with supporting structures 32 in the form of interconnected supporting channels. The floor sections 34 are interconnected by a lip-and-groove joint 35. The floor surface 33 forms a fluid-tight surface. The floor surface 33 is provided with several elongated fixing portions 31, each corresponding to the engagement portions 28 of the widened foot portions 211' of the top-cover sections 20.

The top-cover sections 20 are joined to each other by being placed side by side and with the projecting lip 24 of a top-cover section 20 engaged in the corresponding groove 25 of the adjacent top-cover section 20.

By placing the lip 28 of the top-cover section 20 in engagement with the corresponding fixing portions 31 of the floor 3, the top cover 2 and the floor 3 are interconnected. The top cover 2 may also be fixed to the floor 3 by the use of known fastening means, such as screws (not shown), for example.

As the top cover 2 is installed with the foot portions 211, 211' of the channel walls 21, 21' resting in a fluid-sealing manner on the floor 3, drain channels 5 are formed. With the exception of the drain openings 23, the drain channels 5 are fluid-tight towards the ambient atmosphere and adjacent drain channels 5.

An end portion 51 of the drain channel 5 is connected in a fluid-communicating manner to the collecting channel 4 via a fluid opening 41 in the upper portion of the collecting channel 4. The collecting channel 4 is provided with at least one drain 42 arranged with a liquid seal (not shown), so that the collected fluid is carried away from the collecting channel 4 without more air being admitted than that entering via the drain openings 23.

Between the top cover 2 and the drain 42 of the collecting channel 4, a fluid-transport path 6 is thereby formed. The fluid-transport path 6 is formed in such a way that air admission is restricted to occurring only through the drain openings 23 of the top cover 2.

In FIGS. 1 and 4, the top-cover sections 20 are shown with friction means in the form of serrations 26. The serrations 26 have been removed in the area where the collecting channel 4 abuts against the surface portion 22 of the top cover 2, in order thereby to form a tight joint between the collecting channel 4 and the top cover 2.

In FIG. 4, the top-cover section 20 is shown in an alternative embodiment, with a cable groove 201 for a heater cable 202 to be recessed therein. The cable groove 201 with the heater cable 202 is filled with a sealing substance 203.

The invention claimed is:

1. A device for a helicopter deck comprising a supporting, fluid-tight floor and an overlying, draining top cover formed out of at least two top-cover sections arranged side by side, each of the top-cover sections comprising a surface portion provided with several drain openings and at least one channel wall projecting downwards, provided with a foot portion which is arranged to be positioned on the surface of the floor, wherein the helicopter deck further comprises:

at least one drain channel defined by the top cover, the floor and two adjacent channel walls, the drain channel being provided with a mouth portion which is connected to a collecting channel;

fluid-transport paths being formed through the at least one drain channel between the drain openings and a drain in the collecting channel; and the top-cover sections being detachable from the floor and adjacent top-cover sections.

2. The device in accordance with claim 1, wherein, except for the drain openings, the fluid-transport paths are airtight towards the ambient atmosphere.

3. The device in accordance with claim 1, wherein, in an edge portion, each top-cover section is provided with a projecting portion which is arranged to engage a corresponding groove in the edge portion of the adjacent top-cover section.

4. The device in accordance with claim 1, wherein at least one of the channel walls of the top-cover section is provided with a widened foot portion forming an engagement portion.

5. The device in accordance with claim 4, wherein the engagement portion is arranged to engage a corresponding fixing portion in the surface of the floor.

6. The device in accordance with claim 4, wherein the engagement portion of the widened foot portion is a lip, and the fixing portion of the floor is a corresponding slot.

7. The device in accordance with claim 4, wherein the engagement portion is arranged to be fixed to the floor by the use of a fastening means.

8. The device in accordance with claim 1, wherein the drain channel is directly connected to the collecting channel.

9. The device in accordance with claim 1, wherein the collecting channel has an extent in the entire circumference of the helicopter deck.

10. The device in accordance with claim 1, wherein the drain openings are evenly distributed in the extent of the fluid portion in the longitudinal direction.

11. The device in accordance with claim 1, wherein the perforation ratio of the top cover is 5-15%.

12. The device in accordance with claim 1, wherein the perforation ratio of the top cover is 8-12%.

13. The device in accordance with claim 1, wherein the floor is arranged with a downward slope towards the collecting channel(s).

14. The device in accordance with claim 1, wherein the top-cover section is provided with at least one longitudinal cable groove arranged to receive a heater cable.

15. The device in accordance with claim 14, wherein the cable groove with the heater cable is sealed up with a sealing substance.

\* \* \* \* \*